United States Patent [19]
Iwata

[11] 3,890,536
[45] June 17, 1975

[54] ELECTRONIC FLASH DEVICE FOR PHOTOGRAPHY

[75] Inventor: Hiroshi Iwata, Osaka, Japan
[73] Assignee: West Electric Company, Ltd., Osaka, Japan

[22] Filed: Apr. 3, 1973
[21] Appl. No.: 347,378

Related U.S. Application Data
[63] Continuation of Ser. No. 134,798, April 16, 1971, abandoned.

[30] Foreign Application Priority Data

| | | |
|---|---|---|
| Apr. 27, 1970 | Japan | 45-36576 |
| Apr. 27, 1970 | Japan | 45-36577 |
| June 8, 1970 | Japan | 45-49681 |
| June 8, 1970 | Japan | 45-49682 |
| June 8, 1970 | Japan | 45-49683 |

[52] U.S. Cl. .............. 315/151; 315/159; 315/241 P
[51] Int. Cl. .............. H05b 37/02
[58] Field of Search .... 307/252 C, 252 M; 315/151, 315/156, 159, 241 R, 241 P; 320/1; 323/22 SC

[56] References Cited
UNITED STATES PATENTS

| | | | |
|---|---|---|---|
| 3,504,197 | 3/1970 | Shibuya | 307/252 C |
| 3,591,829 | 7/1971 | Murata et al. | 315/159 |
| 3,612,947 | 10/1971 | Dennewitz | 315/151 |

*Primary Examiner*—R. V. Rolinec
*Assistant Examiner*—Lawrence J. Dahl
*Attorney, Agent, or Firm*—Stevens, Davis, Miller & Mosher

[57] ABSTRACT

An electronic flash device in which the luminescence is automatically controlled in accordance with the distance from the foreground subject. It comprises a luminescent discharge tube, a gate turn off element connected in series with and simultaneously triggered with the discharge tube, a main discharging capacitor to energize the discharge tube for luminescence, a luminescence detection circuit to monitor the luminescence of the discharge tube, and a control capacitor to be discharged by a detection signal from the luminescence detection circuit, thereby producing a cut-off signal impressed upon the gate turn off element to cut off the same so as to automatically control the luminescence of the discharge tube.

7 Claims, 5 Drawing Figures

Figure 1:
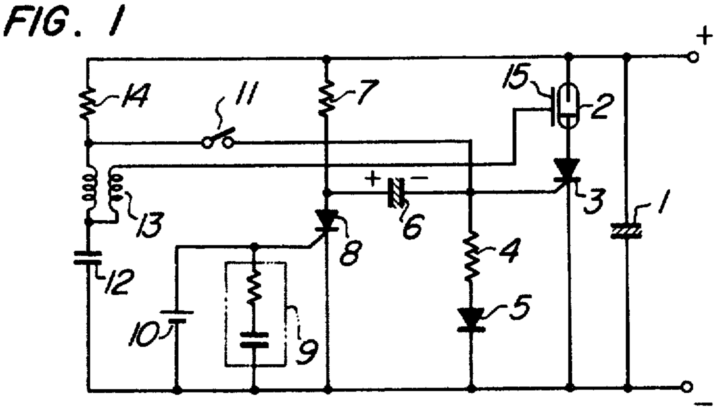

H. IWATA
INVENTOR

BY Stevens, Davis, Miller & Mosher
ATTORNEYS

ELECTRONIC FLASH DEVICE FOR PHOTOGRAPHY

This is a continuation of application Ser. No. 134,798 filed Apr. 16, 1971, now abandoned.

This invention relates to electronic flash devices for photography.

In some prior-art electronic flash devices, the automatic luminescence control is accomplished by connecting the luminescent discharge tube in parallel with a quench tube or a thyristor offering an internal resistance which is small compared to that of the discharge tube and impressing a trigger signal upon said quench tube or thyristor upon reaching a predetermined quantity of reflected light being monitored to cause the quench tube or thyristor to bypass the discharging current from a main discharging capacitor to the discharge tube (as disclosed in the U.S. Pat. No. 3,033,988).

Such automatic luminescence control, however, presents an inherent problem in that even if the distance of the foreground subject to be photographed is small, requiring only a small quantity of light, the energy stored in the main discharging capacitor is all discharged. Therefore, with an electronic flash device using a battery as the power source, a considerable amount of energy of the battery is inevitably lost.

An object of the invention is to eliminate energy loss due to the bypassing of the discharging current through the afore-mentioned quench tube or thyristor.

The invention also features that the malfunctioning of the flash device due to extraneous light other than the light due to the luminescence of the device is prevented.

According to the invention, there is provided an electronic flash device comprising a luminescent discharge tube, a gate turn off element (when a positive signal is applied between the gate and cathode of this element, it is rendered to be conducting between the anode and cathode, while a negative signal is applied the element is turned to be non-conducting, hereinafter this element is refered to GTO) connected in series with said discharge tube, a main discharging capacitor connected across the series circuit of said discharge tube and said GTO element, a trigger circuit consisting of a series circuit of a trigger capacitor, the primary of a transformer, a switch, a resistor and a diode, said resistor and said diode being connected between the gate and cathode of said GTO element, said trigger circuit being adapted to simultaneously provide trigger pulse voltages to both said discharge tube and said GTO element upon closing of said switch to simultaneously trigger both said discharge tube and said GTO element, the trigger pulse voltage to said discharge tube being produced in the secondary coil of said transformer, the trigger pulse voltage to said GTO element being produced across said resistor, said main discharging capacitor being discharged upon the simultaneous triggering of said discharge tube and said GTO element, said discharge tube being energized from said main discharging capacitor for luminescence, a luminescence detection circuit to monitor light radiated from said discharge tube and reflected by a foreground subject, a semiconductor element adapted to be triggered when the quantity of light received by said luminescence detection circuit reaches a predetermined value, and a control capacitor connected between said semiconductor element and the gate of said gate turn off element and being discharged upon triggering of said semiconductor element to impress a reverse cut-off voltage across the gate and cathode of said GTO element, thereby cutting off said GTO element to turn off said discharge tube.

The above and other objects, features and advantages of the present invention will become more apparent from the following description, with reference to the accompanying drawing, in which:

FIGS. 1, 2, 3, 4 and 5 are circuit diagrams showing respective embodiments of the electronic flash device according to the present invention.

FIG. 1 shows a preferred embodiment of the invention. Referring to the figure, numeral 1 designates a main discharging capacitor, which is charged from a power supply to the shown polarity. It is discharged through a series circuit of a luminescent discharge tube 2 and a GTO element 3 to cause luminescence of the discharge tube 2. The discharging of the main discharging capacitor 1 is started only when both the discharge tube 2 and GTO element 3 simultaneously receive respective trigger signals. The trigger signals are provided by a trigger circuit comprising a transformer 13 and a trigger capacitor 12. The capacitor 12 is charged from the main discharging capacitor 1 through a resistor 14 and the primary of the transformer 13. When a switch 11 is closed, the capacitor 12 is discharged through the primary of the transformer 13, switch 11, resistor 4 and diode 5 to induce a high voltage surge across the secondary of the transformer 13, thus giving a trigger signal to the trigger electrode 15 of the discharge tube 2 to excite it. At the same time, a voltage drop is produced across the resistor 4 and diode 5 and is impressed across the gate and cathode of the GTO element 3 to trigger it. In this manner, the discharge tube 2 and GTO element 3 are simultaneously triggered to initiate the discharging of the main discharging capacitor 1. To stop the discharging of the main discharging capacitor 1 it is necessary to impress a reverse cut-off pulse on the gate of the GTO element 3. To provide this reverse cut-off pulse, there is provided a control capacitor 6, which is in series with a resistor 7 and also with the resistor 4 and diode 5, and is charged to the shown polarity.

The quantity of light radiated from the discharge tube 2 is detected by a luminescence detection circuit comprising a solar battery 10 and an integrating circuit 9. A silicon controlled rectifying element 8 is triggered in accordance with the quantity of light reflected from the foregound subject and received by the luminescence detection circuit. Upon triggering of the element 8, the charge that has been stored in the control capacitor 6 to the shown polarity is discharged, thereby impressing a reverse voltage across the gate and cathode of the GTO element 3 to cut off the same so as to turn off the discharge tube 2. In this manner, the luminescence of the discharge tube 2 is automatically controlled.

As is apparent from the foregoing, the first feature of the invention resides in that, for the discharging capacitor 1 both the discharge tube 2 and GTO element 3 are simultaneously rendered operative by closing the single switch 11. To effectively provide the energy stored in the trigger capacitor 12 to the primary coil of the transformer 13 the resistance of the resistor 4 should be made as low as possible.

With a low resistance of the resistor 4, however, most of the energy discharged from the control capacitor 6 to cut off the GTO element 3 is dissipated by the resistor 4, which means that it is necessary to extremely increase the energy stored in the control capacitor 6.

With the diode 5 connected to block the discharging current from the control capacitor 6, the discharging current from the control capacitor 6 will not be bypassed through the resistor 4, thus minimizing the energy loss. At the time of triggering the GTO element 3, the diode 5 is forwardly biased, so that it constitutes no obstacle to the triggering action.

It is the second feature of the invention that the malfunctioning of the device according to the invention is prevented by virtue of the presence of the diode 5. Without the diode 5, if the silicon controlled rectifying element 8 is triggered as a result of the incidence of external light other than that due to the luminescence of the discharge tube 2 to the luminescence detection circuit, the energy stored in the control capacitor 6 would be dissipated through the resistor 4; however, with the diode 5 present, this is avoided to ensure a proper control function.

Figure 2:
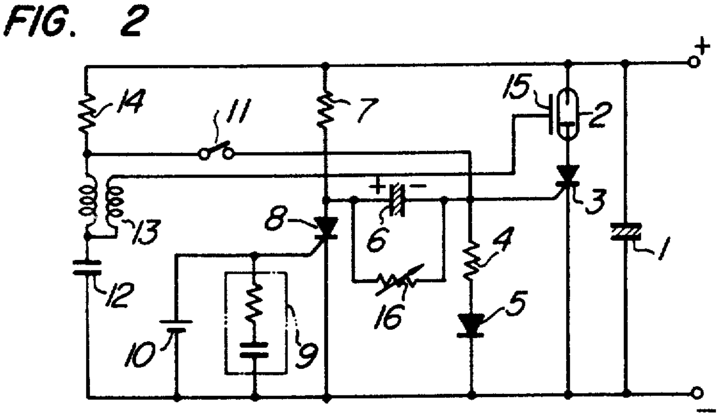

FIG. 2 shows another embodiment in which a variable resistor 16 is connected in parallel with the control capacitor 6. The control capacitor 6 should be charged to develop a terminal voltage sufficient to provide a required gate voltage to the GTO element 3. The variable resistor 16 may be appropriately adjusted to provide a suitable gate voltage to the GTO element 3.

Figure 3:
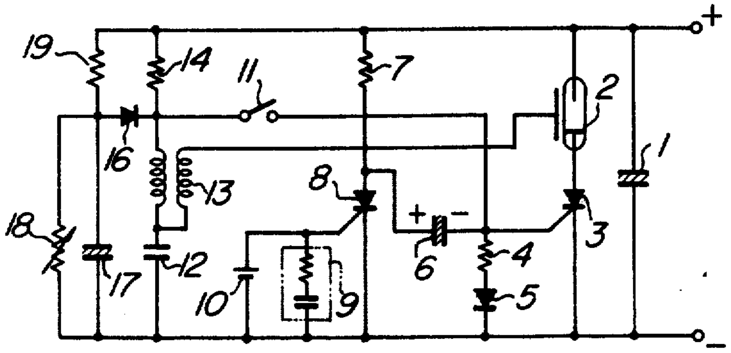

FIG. 3 shows another embodiment which is a further modification of the circuits of FIGS. 1 and 2. In the circuits of FIGS. 1 and 2, if the gate sensitivity of the GTO element 3 is low, failure of the actuation of the element 3 is likely to result because the energy stored in the trigger capacitor 12 for the triggering of the GTO element 3 is usually very low, of the order of 1 to 10 milliwatts. In this embodiment, a series circuit of a resistor 19 and a capacitor 17 is connected in parallel with the series circuit of resistor 14, primary of the transformer 13 and capacitor 12, and a variable resistor 18 is connected in parallel with the capacitor 17. The resistor 19 and variable resistor 18 constitute a voltage divider to divide the terminal voltage across the main discharging capacitor 1 so as to provide appropriate energy to the trigger capacitor 12, so that the GTO element 3 may be reliably triggered. A diode 16' is provided to prevent the energy stored in the trigger capacitor 12 from being transferred to the capacitor 17.

The trigger characteristics of the GTO element are determined not only by the magnitude of the trigger voltage but also by the period of the trigger pulse. With the circuit construction just described, it is possible to provide a trigger signal for a desired period by suitably selecting the capacitance of the capacitor 17. Also, the magnitude of the trigger signal may be suitably preset by appropriately adjusting the variable resistor 18, which widens the scope of the circuit design.

Figure 4:
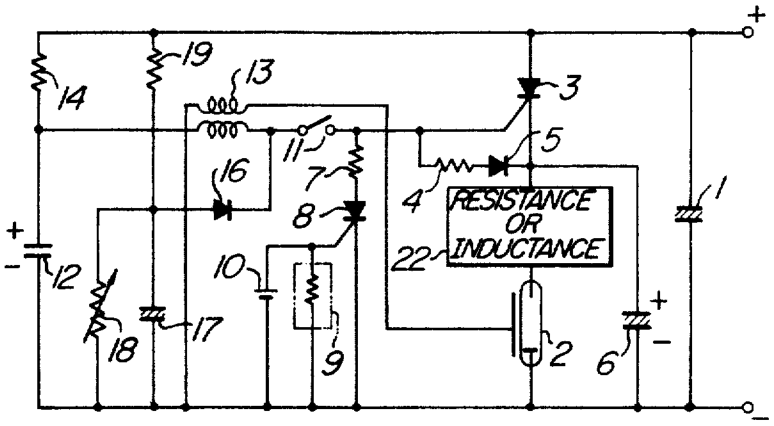

FIG. 4 shows a modification of the circuit of FIG. 3. In this embodiment, when the switch 11 is closed, the energy stored in the trigger capacitor 12 is transferred through the primary of the transformer 13, resistor 4 and diode 5 to the control capacitor 6, while producing a voltage surge in the secondary of the transformer 13 to excite the discharge tube 2. Simultaneously capacitor 17 is discharged through the diode 16, resistor 4 and diode 5 to develop a voltage drop across the resistor 4 and diode 5 in superimposition upon the trigger voltage owing to the trigger capacitor 12 for triggering the discharge tube 12. As soon as the discharge tube 2 and GTO element 3 are turned into the conduction state the discharging of the main discharging capacitor 1 is started. The internal resistance of the discharge tube 2 is very high compared to that of the GTO element 3, so that most of the terminal voltage across the main discharging capacitor 1 is impressed across the discharge tube 2. The capacitance of the control capacitor 6 is very low compared to that of the main discharging capacitor 1, so that it is charged in a very short period of time. In addition to utilizing only the potential developed across both the electrodes of the discharge tube 2 for charging the control capacitor 6, a passive element 22 such as a resistor or inductor for providing a potential difference may be connected in series with the discharge tube 2, and the control capacitor 6 may be connected in parallel with this series circuit. By so doing, the charging voltage across the control capacitor 6 may be suitably preset by appropriately adjusting the resistance or inductance of the passive element 22.

Upon discharging of the main discharging capacitor 1 through the discharge tube 2, the discharge tube 2 starts to glow. The light reflected from the foreground subject is monitored by the luminescence detection circuit of the solar battery 10 and integrating circuit 9. When the quantity of light received by the luminescence detection circuit reaches a predetermined value, the silicon controlled rectifying element or thyristor 8 is triggered, whereupon the control capacitor 6 which has been charged to the shown polarity is discharged through the path between the cathode and gate of the GTO element and through the resistor 7. At this time the discharging current from the control capacitor 6 flows in the opposite direction to that of the charging current flowing to the control capacitor 6 at the time of triggering the GTO element 3, so that the GTO element 3 is cut-off to turn off the discharge tube 2.

It will be appreciated that with the circuit construction described above it is not necessary to have the control capacitor 6 always charged, so that the energy loss may be reduced. Also, since no energy is stored in the control capacitor 6 when the discharge tube 2 is off, even if the silicon controlled rectifying element 8 is accidentally triggered due to an extraneous light signal having the effect of cutting off the GTO element 3 will not take place, which contributes to prevent malfunctioning of the device.

Figure 5:
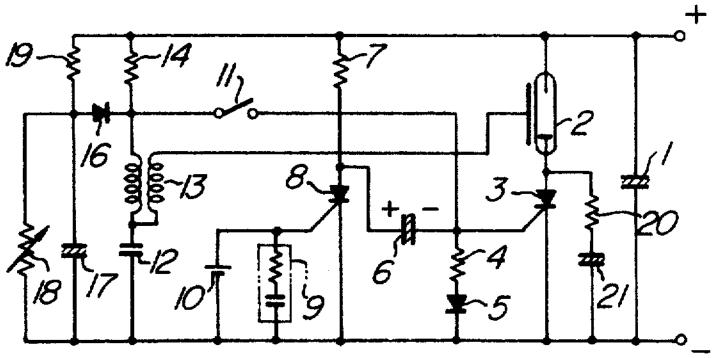

FIG. 5 shows another modification of the circuit of FIG. 3. In this embodiment, a series circuit of a resistor 20 and a capacitor 21 is connected in parallel with the GTO element 3.

Usually, the capacitance of the trigger capacitor 12 is quite low compared to that of the capacitor 17. In other words, there is a difference between the time constants of discharging of these capacitors. Therefore, it is likely that the trigger pulse to the discharge tube 2 ends before the triggering of the GTO element 3 is completed. In such case, the discharge tube 2 and GTO element 3 fail to be simultaneously triggered.

With the series circuit of resistor 20 and capacitor 21 connected in series with the discharge tube 2 it is possible to appropriately preset the resistance of the resistor 20 such that the glow discharge is maintained through the discharge tube 2. By so doing, even if the completion of the triggering of the GTO element is delayed, the discharge tube 2 will be kept excited, so that reliable discharging of the main discharging capacitor 1 may be ensured. Only a minute current corresponding to the glow discharge region flows through the discharge tube 2 before the completion of triggering of the GTO element 3. Thus, during this period substantially no light is radiated from the discharge tube 2, and the automatic luminescence control function is not affected.

What is claimed is:

1. An electronic flash device comprising a luminescent discharge tube having a trigger electrode; a gate turn off element having an anode, a cathode and a gate and connected in series with said discharge tube; a main discharging capacitor connected across the series circuit of said discharge tube and said gate turn off element; a series circuit of a trigger capacitor, the primary of a transformer, a switch, a resistor and a diode, said resistor and said diode being connected between the gate and cathode of said gate turn off element to provide a first trigger circuit for applying a first trigger pulse voltage to said gate turn off element, the secondary of said transformer being connected to the trigger electrode of said discharge tube to provide a second trigger circuit for applying a second trigger pulse to said discharge tube, said first and second trigger circuits simultaneously applying the first and second trigger pulse voltages to said gate turn off element and said discharge tube, respectively, to simultaneously trigger said gate turn off element and said discharge tube when said switch is closed to cause said trigger capacitor to discharge through the primary of said transformer, said resistor and said diode, said main discharging capacitor being discharged upon the simultaneous triggering of said discharge tube and said gate turn off element, so that said discharge tube is energized for luminescence; a luminescence detection circuit to monitor light radiated from said discharge tube and reflected by a foreground subject; and a control circuit coupled to said luminescence detection circuit, including a series circuit of a semiconductor switching element and a control capacitor, connected between the gate and cathode of said gate turn off element, said diode being coupled to said control capacitor forwardly with respect to the charging direction of said control capacitor and reversely with respect to the discharging direction of said control capacitor, said semiconductor switching element being triggered by said detection circuit when the quantity of light received by said luminescence detection circuit reaches a predetermined value; said control capacitor being discharged upon triggering of said semiconductor switching element to impress a reverse cut-off voltage across the gate and cathode of said gate turn off element, thereby cutting off said gate turn off element to turn off said discharge tube.

2. An electronic flash device comprising a luminescent tube having a trigger electrode, an anode and a cathode; a gate turn off element having an anode, a cathode and a gate and connected in series with said discharge tube; a main discharging capacitor connected across the series circuit of said discharge tube and said gate turn off element; a series circuit of a trigger capacitor, the primary of a transformer, a switch, a resistor and a diode, said resistor and said diode being connected between the gate and cathode of said gate turn off element to provide a first trigger circuit for applying a first trigger pulse voltage to said gate turn off element, the secondary of said transformer being connected to the trigger electrode of said discharge tube to provide a second trigger circuit for applying a second trigger pulse voltage to said discharge tube, said first and second trigger circuits simultaneously applying the first and second trigger pulse voltages to said gate turn off element and said discharge tube, respectively, to simultaneously trigger said gate turn off element and said discharge tube when said switch is closed to cause said trigger capacitor to discharge through the primary of said transformer, said resistor and said diode, said main discharging capacitor being discharged upon the simultaneous triggering of said discharge tube and said gate turn off element, so that said discharge tube is energized for luminescence; a luminescence detection circuit to monitor light radiated from said discharge tube and reflected by a foreground subject; and a control circuit coupled to said luminescence detection circuit including a semiconductor switching element connected to the gate of said gate turn off element and a control capacitor connected in parallel with said discharge tube and in series with said gate turn off element, said diode being coupled to said control capacitor forwardly with respect to the charging direction of said control capacitor and reversely with respect to the discharging direction of said control capacitor, said semiconductor switching element being triggered in accordance with the quantity of light received by said luminescence detection circuit, said control capacitor being charged with the voltage across the anode and cathode of said discharge tube and being discharged upon triggering of said semiconductor switching element to impress a reverse cut-off voltage across the gate and cathode of said gate turn off element, thereby cutting off said gate turn off element to turn off said discharge tube.

3. An electronic flash device according to claim 1, wherein the polarity of said diode connected in series with said resistor between the gate and cathode of said gate turn off element is such as to prevent the discharging current from said control capacitor from being bypassed through said resistor.

4. An electronic flash device according to claim 1, which further comprises a variable resistor connected in parallel with said control capacitor, said variable resistor serving to regulate the charging voltage across said control capacitor.

5. An electronic flash device according to claim 1, which further comprises a series circuit of an auxiliary capacitor and a second diode to ensure reliable triggering of said gate turn off element, said series circuit being connected in parallel with the series circuit of said trigger capacitor and the primary of said transformer.

6. An electronic flash device according to claim 1, which further comprises a series circuit of a resistor and a capacitor to maintain the glow discharge region of said discharge tube, said series circuit being connected in series with said discharge tube and in parallel with said gate turn off element.

7. An electronic flash device according to claim 2, which further comprises a passive circuit element such as a resistor to provide a potential difference, said passive element being connected in series with said discharge tube, the series circuit of said discharge tube and said passive element being in parallel with said control capacitor, the potential difference produced across said passive element being stored in said control capacitor.

* * * * *